(12) United States Patent
Klopping et al.

(10) Patent No.: US 9,256,079 B2
(45) Date of Patent: *Feb. 9, 2016

(54) POLARIZED BEAM DIRECTOR AND METHOD

(71) Applicant: Micro-g LaCoste, Inc., Lafayette, CO (US)

(72) Inventors: Fred J. Klopping, Longmont, CO (US); Timothy M. Niebauer, Boulder, CO (US); Ryan M. Billson, Loveland, CO (US)

(73) Assignee: Micro-g LaCoste, Inc., Lafayette, CO (US)

( * ) Notice: Subject to any disclaimer, the term of this patent is extended or adjusted under 35 U.S.C. 154(b) by 248 days.

This patent is subject to a terminal disclaimer.

(21) Appl. No.: 13/797,553

(22) Filed: Mar. 12, 2013

(65) Prior Publication Data

US 2014/0268329 A1  Sep. 18, 2014

(51) Int. Cl.
*G02B 5/30* (2006.01)
*G02B 27/28* (2006.01)
*G01V 7/14* (2006.01)
*G02B 5/122* (2006.01)

(52) U.S. Cl.
CPC ............... *G02B 27/283* (2013.01); *G01V 7/14* (2013.01); *G02B 5/122* (2013.01)

(58) Field of Classification Search
CPC ........ G02B 17/00; G02B 5/12; G02B 5/3025; G02B 17/002; G02B 17/004; G02B 27/10; G02B 27/28; G02B 6/3594; G02B 27/283; G01B 2290/70; G01B 9/02058; G01B 9/02; G01B 11/02; G01V 8/14
USPC ............... 359/485.01–485.07, 629–640, 515, 359/546, 555, 556, 583, 584, 586, 726, 857, 359/528, 529–533; 362/19; 353/20; 349/96, 349/113, 114; 356/368; 324/77, 158
See application file for complete search history.

(56) References Cited

U.S. PATENT DOCUMENTS

| 3,688,584 A | 9/1972 | Stone et al. |
|---|---|---|
| 3,693,451 A | 9/1972 | Dunlap et al. |
| 3,704,626 A | 12/1972 | Stone |
| 3,865,467 A * | 2/1975 | Von Thuna .................. 359/529 |
| 5,305,088 A * | 4/1994 | Hosoe ........................ 356/487 |
| 5,351,122 A | 9/1994 | Niebauer et al. |
| 5,892,151 A | 4/1999 | Niebauer et al. |

(Continued)

FOREIGN PATENT DOCUMENTS

| CN | 102323624 A | 1/2012 |
|---|---|---|
| EP | 0433008 A2 | 6/1991 |

(Continued)

OTHER PUBLICATIONS

Christian Rothleitner, "Ultra-high Precision, Absolute, Earth Gravity Measurements," dissertation, 2008, pp. 1-160, University Erlangen-Nuremberg, Berlin, Germany.

(Continued)

*Primary Examiner* — Derek S Chapel
(74) *Attorney, Agent, or Firm* — John R. Ley

(57) ABSTRACT

Incident differently-polarized light beams are separately directed and combined by one or two corner cube structures, each having one or two walls formed as a beam splitter. One incident light beam is passed, while the other incident light beam is reflected.

31 Claims, 11 Drawing Sheets

(56) References Cited

U.S. PATENT DOCUMENTS

| | | |
|---|---|---|
| 6,325,172 B1 | 12/2001 | Langridge et al. |
| 2003/0081218 A1 | 5/2003 | Orban |
| 2008/0034855 A1 | 2/2008 | Peeters |
| 2009/0219546 A1 | 9/2009 | Benischek |
| 2011/0046913 A1 | 2/2011 | Hilby |
| 2014/0260605 A1* | 9/2014 | Klopping et al. ........... 73/382 R |

FOREIGN PATENT DOCUMENTS

| | | |
|---|---|---|
| EP | 0433008 A3 | 6/1991 |
| EP | 2348338 A1 | 7/2011 |
| FR | 2089057 A5 | 1/1972 |
| WO | 2011/086020 A1 | 7/2011 |
| WO | 2014/163922 A2 | 10/2014 |

OTHER PUBLICATIONS

C. Rothleitner et al., "A method for adjusting the centre of mass of a freely falling body in absolute gravimetry," 2007, pp. 234-241, IOP Publishing, Metrologia, Bristol, Great Britain.

A. Vitouchkine et al., "Short Communication—A direct and sensitive method for positioning the centre of mass of a dropping object at the optical centre of the enclosed corner cube in ballistic absolute gravimeters," 2004, pp. L19-L21, Institute of Physics Publishing, Metrologia, Bristol, Great Britain.

T. Niebauer et al., "A new generation of absolute gravimeters," 1995, pp. 159-180, Metrologia.

PCT International Search Report with attached Written Opinion of the International Searching Authority for International Application No. PCT/US2014/019045, dated Jun. 23, 2014, 10 pages.

PCT International Search Report with attached Written Opinion of the International Searching Authority for International Application No. PCT/US2014/018912, dated Oct. 31, 2014, 22 pages.

L. F. Vitushkin et al., "Ballistic Gradiometer for the Measurement of the Vertical Gravity Gradient: A Proposal," pp. 47-51, Proceedings of the IAG Symposium on Airborne Gravity Field Determination at the IUGG XXI General Assembly, Calgary, Aug. 1995, 200 pages, retrieved from the Internet: URL:http://www.ucalgary.ca/engo_webdocs/ Special Publications/Proceedings_IAGSymposiumOnAirborneGravityFieldDetermination_1995.pdf.

* cited by examiner

POLARIZED BEAM DIRECTOR AND METHOD

CROSS REFERENCE TO RELATED INVENTION

This invention is related to U.S. patent application Ser. No. 13/797,451, titled "Polarized Beam, Matched Coincident Beam Path, Interferometric Gradiometer Apparatus and Method," filed concurrently herewith by the inventors hereof, and assigned to the assignee hereof. The subject matter of this US patent application is incorporated herein by this reference.

FIELD OF THE INVENTION

This invention relates to a new and improved optical apparatus and method for separately directing polarized light beams according to the polarization of those light beams. This invention is particularly useful for separating and combining light beams having mutually different planes of polarization, particularly when those light beams traverse the same common, coincident or nearly coincident beam paths and when each of the light beams contain respectively different information that must be preserved or not adversely influenced by the information of the other polarized light beam.

BACKGROUND OF THE INVENTION

In general, light is electromagnetic radiation which oscillates. The frequency of oscillation establishes a wavelength for the light. Light wavelengths in the range of about 4,000 to 7,700 angstroms (Å) are perceived by the normal human eye, with different colors having different wavelengths. Light at other frequencies and wavelengths is not perceived by the human eye.

Polarized light has oscillatory electrical and magnetic properties that are confined to a particular plane. The plane is stationary and extends perpendicular to the path of the light beam. For example, a light beam which propagates in a horizontal beam path may have a vertical plane of polarization. In general, most light visible to the normal human eye is not polarized, meaning that the oscillatory electrical and magnetic properties exist randomly in many different orientations in the plane perpendicular to its propogation.

Polarized light beams are used in many technical and scientific applications, usually under circumstances where multiple light beams occupy the same, common or coincident beam paths. Each light beam can carry separate information encoded into the frequency, wavelength or phase relationship of the polarized light beam. Because polarized light beams have specific planes of polarization, multiple polarized light beams can propagate in the same coincident beam path while still preserving the information unique to each light beam. Each of the light beams remains distinguishable from the other because of its own unique plane of polarization, even though all the beams may occupy the same or a similar beam path.

In technical and scientific applications, it is frequently necessary to separate one polarized light beam from each other individual polarized light beam in a common beam path. Separation is required because it is necessary or desirable to change or modify the information carried by one of the polarized light beams, such as changing its frequency, wavelength or phase relationship without changing its plane of polarization or without influencing the information in the other light beam. Similarly, it is also frequently necessary to add an additional polarized light beam to a common beam path occupied by one or more other polarized light beams. It is important when separating or combining the light beams that the beam which remains in the beam path is not adversely influenced by the separation or combination.

Both the separating and combining requirements are frequently needed when one of the polarized light beams is used to measure or respond to some characteristic before rejoining the common beam path with the other light beam or beams having different planes of polarization. One such exemplary application is described in the above referenced US patent application, where two differently-polarized beams of light are reflected from two separated, freefalling test masses to obtain relative phase and frequency information by which to determine a differential in gravity acting on the two separated, freefalling test masses. After reflection off of the two test masses, the two polarized light beams are compared. The phase and frequency information measures the minute change in separation distance between the two test masses during their free fall. The change in separation distance is directly related to the difference in gravity acting upon the two test masses. This type of instrument is known as a gravity gradiometer.

In many technical and scientific applications, exemplified by the gravity gradiometer described in the above referenced US patent application, there are many and significant practical requirements, all of which must be obtained in order to preserve the functional accuracy and integrity of the application. For example, any change in position of an optical element can adversely affect the information carried by each of the polarized light beams, because the change in position will be reflected in a change in frequency, wavelength and phase of the polarized light beam. Any change in frequency, wavelength and phase of the polarized light beam caused by an unintended external effect adversely changes the information carried by that light beam in an unintended or erroneous manner and thereby appears as an error or inaccuracy. Temperature changes, vibration and external perturbations all have the ability to adversely affect the information carried by the light beams. Temperature changes may cause movement of the optical elements which changes the alignment of the beam paths and thereby diminishes the energy of those beam paths to an extent that makes detection and use inaccurate or impossible. Movement of the optical elements may change the beam path length and thereby change the frequency, wavelength and phase of the polarized light beam in the beam path. There are other types of unintended adverse external physical influences which negatively impact light beams.

There are discrete optical components which may be used for separating one polarized light beam from a common beam path occupied by another polarized light beam, or for combining one polarized light beam with another polarized light beam in a common beam path. However, multiple discrete optical components are typically required for such separation or combination. Each of the separate discrete optical elements consumes a significant amount of space, and the number of the discrete optical elements usually required consumes even more space. These factors make it difficult or impossible to incorporate beam separation and combination optical elements in technical and scientific devices where space is limited.

Another problem is that each of the discrete optical components must be precisely positioned and that position must be maintained independent of the other optical components so that the light beam paths remain oriented and directed to achieve the desired and intended functionality. Changes in temperature, vibration and other external perturbations all have the ability to change the alignment of the discrete optical components. The process necessary to achieve the desired alignment of the discrete optical components is difficult, tedious and time-consuming. Furthermore, maintaining the alignment often depends on external support devices which themselves are subject to changes in temperature, vibration and external perturbations.

SUMMARY OF THE INVENTION

This invention describes a polarized beam director which separately directs first and second incident light beams having respectively different or perpendicular planes of polarization. The polarized beam director is formed as a single optical element, a corner cube structure, thereby avoiding the problems of assembling, aligning and maintaining the alignment of multiple discrete optical elements. The polarized beam director has the capability of simultaneously diverting the separated polarized light beam and combining another incident polarized light beam, without adversely influencing a common path polarized light beam from which the separated light beam was previously combined and to which the other incident light beam is combined. The corner cube structure of the polarized beam director may be constructed in a very compact size which permits the beam separation and combination functions to be achieved in devices and applications where space is limited. Because of the nature of the corner cube structure, the beam paths remain essentially unaffected by the effects of temperature change and external vibrations and perturbations. The nature of the corner cube structure inherently compensates for the effects of temperature change and external vibrations and perturbations, without adversely influencing the information carried by the multiple polarized light beams. The alignment of beams is inherently stable even when the corner cube structure is rotated or translated. The assembly process is greatly simplified in those technical and scientific devices in which the polarized beam director is incorporated.

In accordance with one aspect of the invention, the corner cube structure of the polarized beam director comprises first, second and third walls which occupy a mutually perpendicular relationship with respect to one another and which intersect one another at a virtual corner. First and second incident polarized light beams having different planes of polarization impinge upon at least one of the first, second and third walls. The first wall comprises a beam splitter which has polarization characteristics which pass the first incident light beam and reflect the second incident light beam. The first, second and third walls reflect the second incident light beam reflected from the first wall. In this manner, the first incident light beam is passed through the polarized beam director without adverse influence, while the second incident light beam is separated from the first incident light beam because of the reflection.

Also, in accordance with another aspect of the invention, the polarized beam director comprises a second corner cube structure in addition to the first corner cube structure previously described. The second corner cube structure comprises fourth, fifth and sixth walls which occupy a mutually perpendicular relationship with respect to one another and intersect at a virtual corner. The fourth wall comprises a beam splitter which has characteristics which pass the first incident light beam and reflect a third incident polarized light beam having a plane of polarization different from the first incident light beam. The corner cube structures are located so the first incident light beam passing through the first wall of the first beam splitter also passes through the fourth wall of the second beam splitter. The second incident beam is reflected from the first, second and third walls. The third incident light beam is reflected from the fourth, fifth and sixth walls into a preferable common path with the first incident light beam passed through the polarized beam director.

Further still, in accordance with yet another aspect of the invention, the polarized beam director having the two corner cube structures adds an additional beam splitter to the second and fifth walls. The beam splitter of the fifth wall passes a fourth incident light beam having a plane of polarization different from the plane of polarization of the third incident light beam. The beam splitter of the second wall passes the fourth incident light beam into a preferable common beam path with the second incident light beam which has been reflected from the first, second and third walls.

Other aspects of the invention involve methods of using the aforementioned polarized beam directors to separately direct the incident beams of light and the transmitted beams of light.

A more complete appreciation of the present invention and its scope may be obtained from the accompanying drawings, which are briefly summarized below, from the following detailed description of presently preferred embodiments of the invention, and from the appended claims.

DETAILED DESCRIPTION

Figure 1:
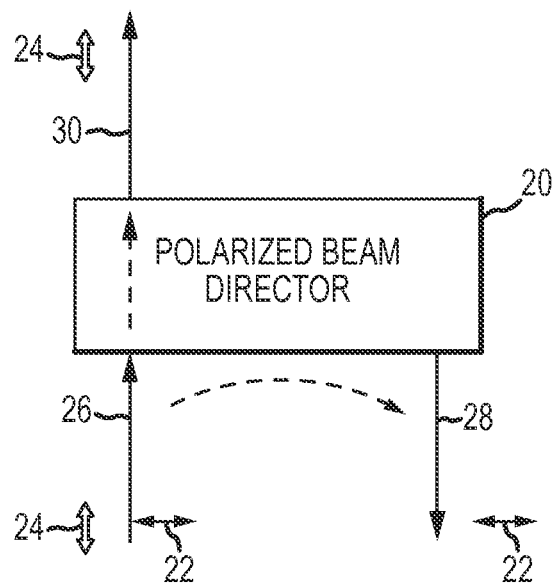
FIG. 1 is a generalized block and optical beam path diagram of one polarized beam director which incorporates of the present invention.

A polarized beam director 20 which incorporates the present invention is illustrated in FIG. 1. The polarized beam director 20 responds to two polarized light beams 22 and 24 which have mutually perpendicular or different planes of polarization. For purposes of illustration, the polarized light beam 22 is shown by a single-shafted double-headed arrow, and the polarized light beam 24 is shown by a double-shafted double-headed arrow. The heads and the shafts of the arrows illustrate the different planes of the polarization of the light beams 22 and 24. The arrows denote the respectively different electric fields that oscillate perpendicular to the path of propagation.

The polarized beam director 20 directs two incident beams 22 and 24 differently according to their planes of polarization. One of the polarized light beams, for example light beam 22, is reflected by the polarized beam director 20 as though the beam director was a conventional retroreflector. The other one of the polarized light beams, for example light beam 24, passes through the polarized beam director 20 as though the beam director 20 was optically transparent.

The incident light beams 22 and 24 impinge on the polarized beam director 20 in a coincident beam path 26. The polarized light beams 22 and 24 are coincident because they occupy the same beam path 26. Alternatively, the light beams 22 and 24 may occupy their own separate, parallel and closely adjoining parallel incident beam paths (not shown). Because the light beams 22 and 24 have mutually different planes of polarization, each light beam 22 and 24 carries its own unique and distinguishable information. That information remains uninfluenced and not corrupted by the information of the other light beam, even when both light beams 22 and 24 are coincident and traverse the same beam path. Although a mutually perpendicular polarization of the two light beams 22 and 24 is preferred, a mutually different polarization of the light beams is satisfactory provided that the light beams contain sufficient energy.

The polarized beam director 20 is particularly useful in those optical situations where it is necessary to separate one polarized light beam from another light beam having a different plane of polarization. In the example shown in FIG. 1, the polarized light beam 22 is separated from the polarized light beam 24, even though the light beams 22 and 24 previously occupied the same coincident beam path 26. The light beam 22 is reflected or diverted from the coincident beam path 26 into a separate diverted beam path 28. The light beam 24 passes through the polarized beam director 20 and continues in a delivery beam path 30. The delivery beam path 30 is aligned parallel with the incident beam path 26. The diverted beam path 28 is also aligned with and parallel to the incident beam path 26.

More details concerning the polarized beam director 20 and its optical functionality are described in connection with FIGS. 2-4.

Figure 2:
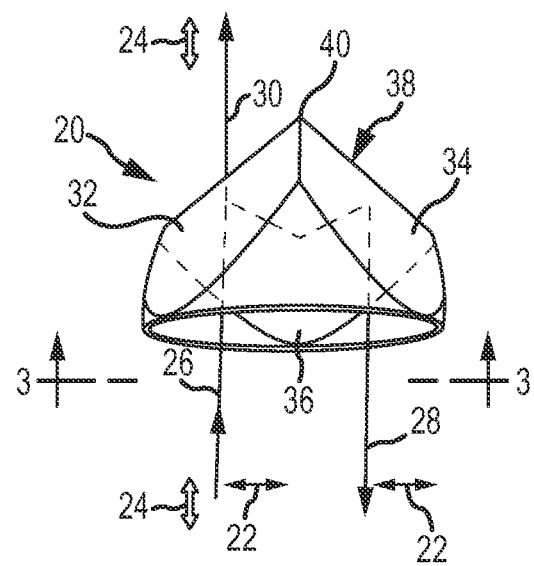
FIG. 2 is a generalized perspective view of the polarized beam director shown in FIG. 1, showing beam paths of differently polarized light beams.
Figure 3:
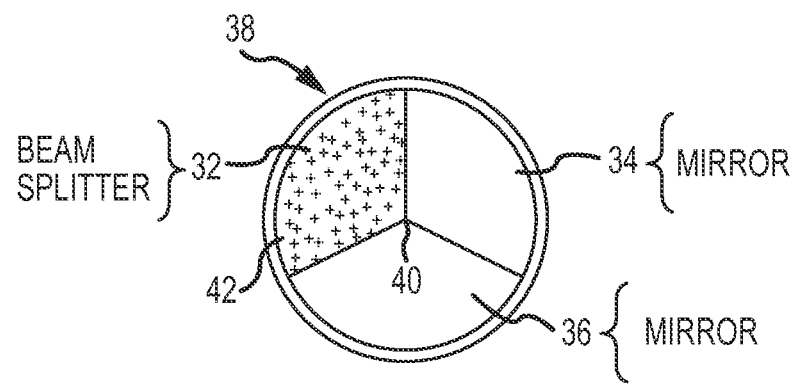
FIG. 3 is a horizontal cross-sectional view of the polarized beam director shown in FIG. 2, taken substantially in the plane of lines 3-3 in FIG. 2.
Figure 4:
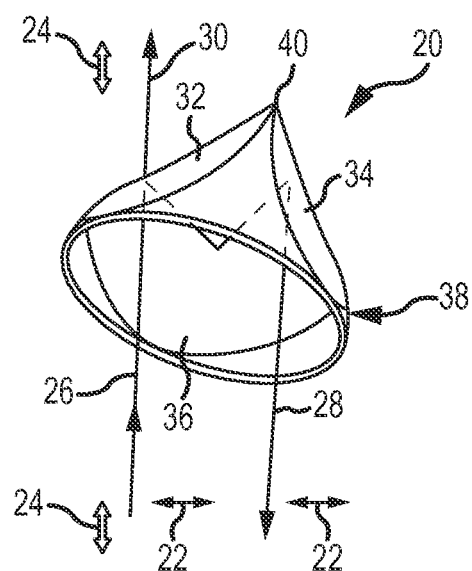
FIG. 4 is another generalized perspective view of the polarized beam director, shown in FIG. 2, taken from a different perspective.

The polarized beam director 20 has three mutually perpendicular walls 32, 34 and 36 which form a corner cube structure 38, shown in FIGS. 2-4. The walls 32, 34 and 36 intersect one another at mutually perpendicular angles and define an actual or virtual corner 40 which faces in the direction of impingement by the light beams 22 and 24 in the incident beam path 26. The walls 32, 34 and 36 are held in a connected and mutually perpendicular relationship.

The walls 32, 34 and 36 of the corner cube structure 38 are formed from a plate or layer of optically transmissive material, such as glass. The wall 32 comprises a polarized beam splitter. The polarized beam splitter is formed by a conventional thin film polarizer 42 attached to the optically transparent material of the wall 32. The walls 34 and 36 of the corner cube structure 38 are formed as mirrors or optical reflectors. Each mirror or optical reflector is formed by a layer of conventional optically reflective material attached to the walls 34 and 36.

The thin film polarizer 42 preferably constitutes a coating of conventional polarizing optical material on the wall 32. The coating of polarizing material is represented by hatching shown in FIG. 3. The coating of the thin film polarizer 42 achieves a light polarizing characteristic according to and in relation to the thickness of the coating, the angle of an incident beam impinging upon that coating, and the plane of polarization of the incident light beam. With the proper selection of the coating thickness, and the angle of the incident beam and the plane of polarization of the incident beam, the coating of polarizing material has the effect of passing an incident polarized light beam which has a plane of polarization that is parallel to or aligned with the polarizing characteristics established by the thin film polarizer 42.

In accordance with its characteristics, the thin film polarizer 42 passes the polarized light beam 24 through the wall 32 with a plane of polarization aligned with the polarizing characteristics, which is the same plane of polarization that the light beam 24 occupies in the incident beam path 26. The polarized beam director 20 therefore acts as an optically transparent window or optical conductor to an incident light beam having a plane of polarization aligned with the polarizing characteristics of the thin film polarizer 42, thereby directing the incident light beam 24 through the polarized beam director 20 without diversion, without changing the relative phase, wavelength or frequency information contained in the light beam 24, and without changing its plane of polarization. As shown in FIGS. 1 and 2, the light beam 24 passes directly through the polarized beam splitter wall 32.

On the other hand, an incident light beam having a non-aligned plane of polarization, which is substantially perpendicular to the polarizing characteristics of the thin film polarizer 42, is reflected from the thin film polarizer 42 as though it was a reflector or mirror. In this circumstance, the incident light beam 22, which has a plane of polarization perpendicular to the polarizing characteristics of the thin film polarizer, is reflected from the beam splitter wall 32 to the other two walls 34 and 36, in the same manner as a conventional retroreflector reflects incident light. The reflected light beam exits from corner cube structure 38 in the diverted beam path 28 in a direction parallel to the incident light beam, just as in a conventional retroreflector. As shown in FIGS. 1 and 2, the light beam 22 reflects from the beam splitting wall 32 onto the mirror walls 34 and 36, and then passes away from the polarized beam director 20 in the diverted beam path 28.

When incident light beam having a non-aligned plane of polarization is reflected from the thin film polarizer 42 on the wall 32, the reflected beam intersects and reflects off of the other two walls 34 and 36 of that corner cube structure 38. However, the reflection does not change the plane of polarization of the light beam 22, and the light beam 22 projects along the diverted beam path 28 with the same polarization as in the incident beam path 26.

The corner cube structure 38 is open faced, meaning that the incident light beam 22 passes through the ambient environment when it impinges upon and reflects off of the walls 32, 34 and 36 before exiting the corner cube structure 38 in the diverted beam path 28. The mutually perpendicular angular relationship of the walls 32, 34 and 36 creates an optical characteristic in which the reflected light beam always reflects from the corner cube structure 38 parallel to the incident light beam. This parallel relationship is maintained through a wide operative range of angles of the incident light beam 22.

Thus, in response to the two mutually perpendicularly polarized incident light beams 22 and 24, the beam splitting wall 32 of the polarized beam director 20 passes the vertically polarized (as shown) light beam 24 into the delivery beam path 30, and the beam splitting wall 32 reflects the horizontally polarized (as shown) light beam 22 to the other two mirror walls 34 and 36. The corner cube structure 38, acting in the manner of a retroreflector, reflects or diverts the light beam 22 into the diverted beam path 28.

Figure 5:
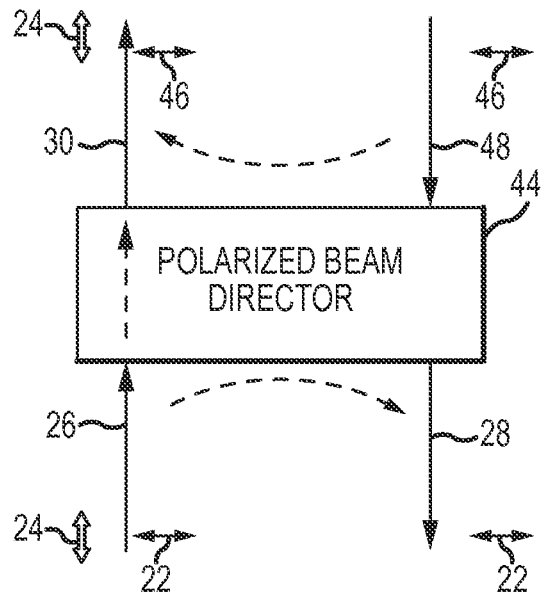
FIG. 5 is a generalized block and optical beam path diagram of another polarized beam director which also incorporates of the present invention.

Another polarized beam director 44 which incorporates the present invention, is shown in FIG. 5. The polarized beam director 44 accomplishes all of the optical functionality of the polarized beam director 20 (FIG. 1-4), and in addition, further combines separated, differently polarized light beams into a single coincident beam path. As shown in FIG. 5, the impinging vertically polarized (as shown) light beam 24 is passed through the polarized beam director 44 into the delivery beam path 28 in the same manner as the light beam 24 is passed through the polarized beam director 20 (FIG. 1). The horizontally polarized (as shown) impinging light beam 22 is reflected into the diverted beam path 28, in the same manner as the light beam 22 is reflected from the polarized beam director 20 (FIG. 1).

The polarized beam director 44 has the additional capability of combining a third incident polarized light beam 46 in a second incident beam path 48 with the light beam 24 in the delivery path 30. The polarized beam director 44 combines the polarized light beams 24 and 46 in the same coincident delivery path 30 or in separate, parallel and closely adjoining parallel delivery beam paths (not shown).

The optical functionality of the polarized beam director 44 is particularly useful when the light beam 46 has been subjected to optical effects separately from the other light beam 24. An example of such functionality is described in the above identified US patent application, where two separate light beams are used in a gravity gradient measurement instrument, and the two optical light beams are separately subjected to different influences by which to measure the gravity gradient. For the reasons described in that US patent application, it is advantageous that the two beams occupy a coincident beam path to the greatest extent possible. Thus, a polarized beam director such as that shown at 44 allows one of the beams to be separated from the other, the separated beam to be subjected to its own unique influences, and then the separated beam to be recombined with the other beam and occupy a coincident beam path. In that particular situation, the separated light beam 22 becomes the second incident light beam 46, (FIG. 5). However, the incident light beam 46 can be separate from and unrelated to the diverted light beam 26 (FIG. 1).

More details concerning the polarized beam director 44 and its optical functionality are described in connection with FIGS. 6-8.

The polarized beam director 44 includes two corner cube structures which face in opposite directions. The lower (as shown) corner cube structure is identical to the corner cube structure 38 of the polarized beam director 20 (FIGS. 1-4) and for that reason is designated by the same reference number 38. The lower corner cube structure has the three mutually perpendicular walls 32, 34 and 36 which intersect one another at the common corner 40. An upper (as shown) corner cube structure 50 is added to create the polarized beam director 44. The upper corner cube structure 50 has three mutually perpendicular walls 52, 54 and 56 which intersect one another at a common corner 58. Preferably the corners 40 and 58 are coincident with each other, as shown. The corner cube structures 40 and 58 also have their optical center points located co-linearly with the corners 40 and 58. The optical center point of each corner cube structure is a point equidistant from each of the walls and about which when the corner cube structure is rotated, the path length of the reflected light beam remains constant.

Figure 6:
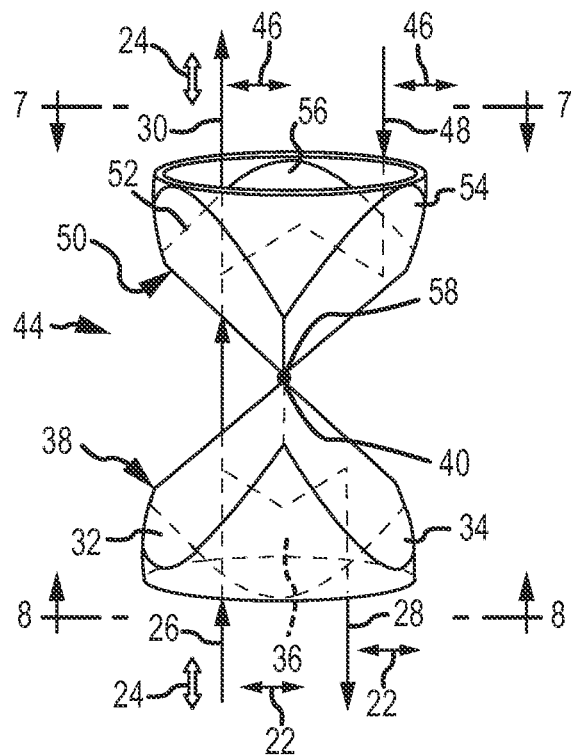
FIG. 6 is a generalized perspective view of the polarized beam director shown in FIG. 5, showing beam paths of differently polarized light beams.
Figure 7:
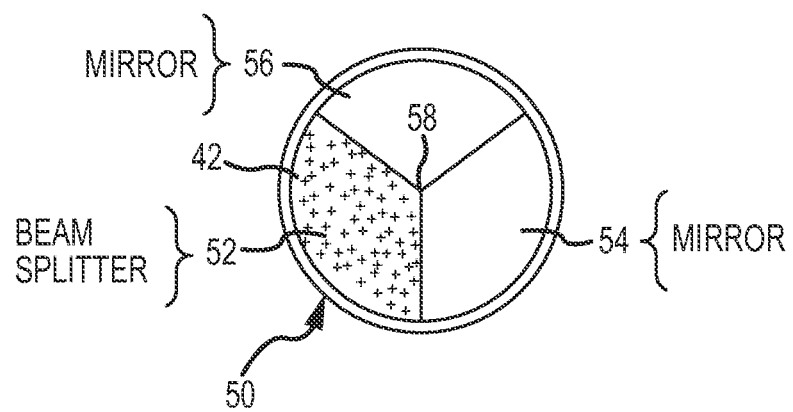
FIGS. 7 and 8 are horizontal cross-sectional views of the polarized beam director shown in FIG. 6, taken substantially in the planes of lines 7-7 and 8-8 in FIG. 6, respectively.
Figure 8:
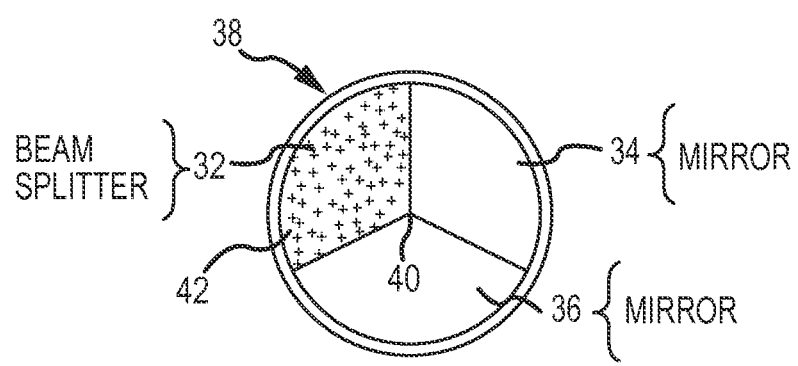

The walls 32 and 52, 34 and 54 and 36 and 56 are vertically aligned with one another parallel to the collinear relationship of the center points and corners of the corner cube structures 38 and 50, as is understood from FIGS. 6-8. The walls 32, 34, 36, 52, 54 and 56 of the corner cube structures 38 and 50 are formed from a plate or layer of optically transmissive material, such as glass. The walls 32 and 52 of the corner cube structures 38 and 50, respectively, comprise polarized beam splitters. Each polarized beam splitter is formed by a conventional thin film polarizer 42 which has the polarizing characteristics previously described in connection with the thin film polarizer 42 of the polarized beam director 20 (FIGS. 1-4). Thin film polarizers 42 are attached to the optically transparent material of each wall 32 and 52, as shown by the hatching in FIGS. 7 and 8. The walls 34, 36, 54 and 56 are formed as mirrors or optical reflectors. Each mirror or optical reflector is formed by a layer of conventional optically reflective material attached to the walls 34, 36, 54 and 56.

As a consequence of the vertically offset alignment of the beam splitter walls 32 and 52 to which the thin film polarizers 42 have been attached, and the substantially identical angular orientation of the thin film polarizers 42 on the walls 32 and 52 relative to the angle of the incident light beam 24, the thin film polarizers 42 pass polarized light beams through the walls 32 and 52 due to their polarizing characteristics. A polarized light beam 24 passing through the wall 32 will intersect the vertically aligned wall 52 at the same angle of incidence as to the wall 32, and will thereby pass through the aligned wall 52 in the same manner that it passed through the wall 32, since the thin film polarizers 42 on both walls are approximately the same thickness. The polarized beam director 44 therefore acts as an optically transparent window or optical conductor to an incident light beam 24 having a plane of polarization aligned with the polarizing characteristics of the thin film polarizers 42 on the walls 32 and 52, thereby passing the light beam 24 directly through the aligned beam splitter walls 32 and 52 and directing that light beam through the polarized beam director 44 without diversion.

On the other hand, the incident light beam 22, which has polarization substantially perpendicular to the polarizing characteristics of the thin film polarizer 42 on the wall 32, is reflected from the beam splitter wall 32 as though the wall 32 was a reflector or mirror, in the same manner as has been previously described in connection with the polarized beam splitter 20 (FIGS. 1-4). The incident light beam 22 having the non-aligned plane of polarization relative to the polarizing characteristics of the beam splitter wall 32 is reflected from the walls 32, 34 and 36 of the corner cube structure 38, in the same manner as a retroreflector.

The same situation occurs with respect to the third incident polarized light beam 46 in the second incident beam path 48. The third polarized light beam 46 impinges upon and reflects from the mirror walls 54 and 56 of the upper corner cube structure 50, and thereafter encounters the beam splitter wall 52. The third light beam 46 impinges upon the beam splitter wall 52 with a plane of polarization which is substantially perpendicular to the polarizing characteristics of the thin film polarizer 42 on the beam splitter wall 52. Consequently, the third light beam 46 is reflected from the beam splitter wall 52 as though the beam splitter wall was a mirror. The reflected third light beam 46 exits from the corner cube structure 50 in a direction parallel to the delivery beam path 30, just as in a conventional retroreflector. The reflected light beam 46 joins the polarized light beam 24 coincidentally in the delivery beam path 30. Alternatively, the light beams 24 and 46 may occupy their own separate, parallel and closely adjoining parallel delivery beam paths (not shown).

In order for the third incident light beam 46 to reflect from the beam splitting wall 52, the plane of polarization of the third incident light beam 46 may be adjusted before encountering the mirror wall 54 of the corner cube structure 50. Under appropriate circumstances, the thickness of the thin film polarizer 42 on the beam splitter wall 52 might be adjusted, provided that the adjustment does not adversely influence the passage of the polarized light beam 24. Alternatively, a conventional beam rotator could be located in the space within the three mutually perpendicular walls of the corner cube structure 50, to establish the appropriate orientation of the reflected beam 46 so that it reflects from the beam splitter wall 52. The concern about maintaining or not substantially adversely affecting the plane of polarization of the third reflected beam 46 is one of maintaining sufficient energy in the beam 46. So long as there is sufficient energy in the reflected beam 46, it may be unnecessary to adjust the plane of polarization of the incident third light beam 46, adjust the coating thickness of the other thin film polarizer 42 on the beam splitter wall 52, or use of a beam rotator within the corner cube structure 50, for example.

Thus, in response to the three polarized incident light beams 22, 24 and 46, the beam splitting walls 32 and 52 of the polarized beam director 44 pass the vertically polarized (as shown) light beam 24 into the delivery beam path 30. The corner cube structure 38, acting as a retroreflector to the mutually perpendicularly polarized light beam 22, reflects or diverts the horizontally polarized (as shown) light beam 22 into the diverted beam path 28. The corner cube structure 50, acting as a reflector to the third polarized light beam 46, reflects and combines the horizontally polarized light beam 46 (as shown) into the delivery beam path 30.

Figure 9:
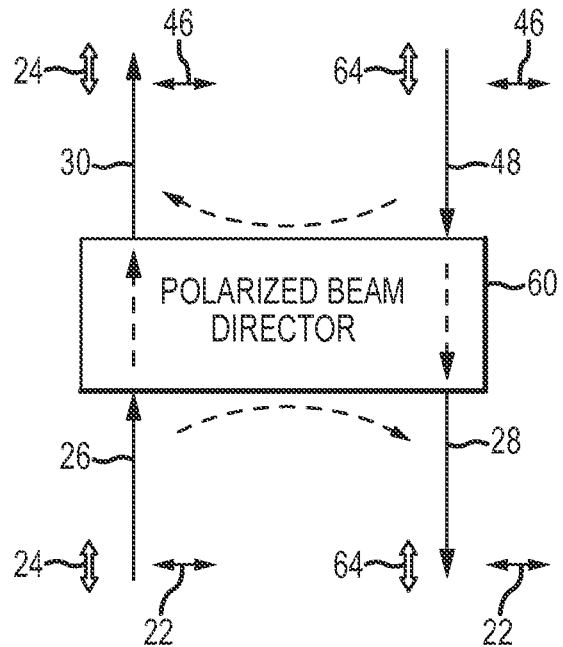
FIG. 9 is a generalized block and optical beam path diagram of another polarized beam director which also incorporates of the present invention.

Another polarized beam director 60 which also incorporates the present invention is shown in FIG. 9. The polarized beam director 60 is capable of performing all of the optical functionality of the polarized beam directors 20 and 44 (FIGS. 1-4 and 5-8) in addition to the further optical functionality of passing through a fourth incident polarized light beam 64 and combining the light beam 64 with the light beam 22 in the diverted beam path 28. The light beams 22 and 64 have different planes of polarization. As shown in FIG. 9, the impinging vertically polarized (as shown) light beam 24 is passed through the polarized beam director 60 into the delivery beam path 28 in the same manner as the light beam 24 is passed through the polarized beam director 20 (FIG. 1). The horizontally polarized (as shown) impinging light beam 22 is reflected into the diverted beam path 28, in the same manner as the light beam 22 is reflected from the polarized beam directors 20 and 44 (FIGS. 1 and 5). The horizontally polarized (as shown) impinging light beam 46 is reflected into the delivery beam path 30 by the polarized beam director 60 in the same manner as the light beam 46 is reflected from the polarized beam director 44 (FIG. 5).

The polarized beam director 60 has the additional capability of passing the fourth polarized incident light beam 64 (shown vertically polarized) through the polarized beam director 60 from the second incident beam path 48 into the diverted beam path 28. The planes of polarization of the incident light beams 46 and 64 are respectively perpendicular to or different from one another in the second incident beam path 48, and the incident light beams 46 and 64 may be coincident with one another in the second incident beam path 48. In addition, the planes of polarization of the light beams 22 and 64 in the diverted beam path 28 will be respectively different. The light beams 22 and 64 may be coincident with each other in the diverted beam path 28 or may occupy different, separated, parallel paths parallel to the second incident beam path 28.

The polarized beam director 60 has the capability of separating the four incident light beams 22, 24, 46 and 64 to allow each of them to be subjected to optical effects separately from the other light beams. Thereafter, the light beams may be recombined in coincident beam paths 28 and 30. This functionality is particularly useful when each light beam is subjected to optical effects separately from the other light beams. An example of such functionality is described in the above identified US patent application, where two separate light beams are used in a gravity gradient measurement instrument, and the two optical light beams are separately subjected to different influences by which to measure the gravity gradient. For the reasons described in that US patent application, it is advantageous that the two beams occupy a coincident beam path to the greatest extent possible. Thus, the polarized beam director 60 allows each of the two different or mutually perpendicular polarized light beams in each pair of coincident beam pairs (22, 24 and 46, 64) to be separated from the other, the separated beams subjected to unique optical influences, and then the beams recombined in a coincident beam path.

Figure 10:
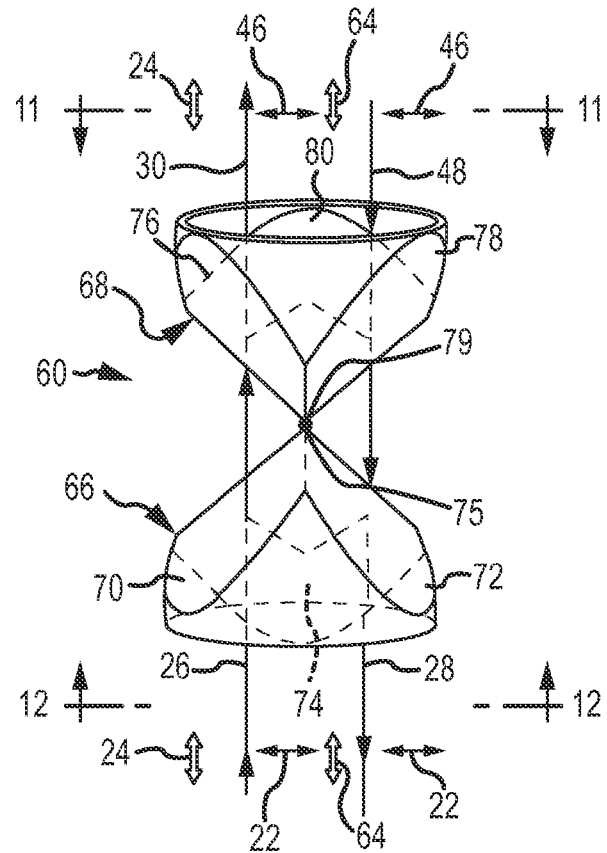
FIG. 10 is a generalized perspective view of the polarized beam director shown in FIG. 9, showing beam paths of differently polarized light beams.

More details concerning the polarized beam director 60 and its optical functionality are described in connection with FIGS. 10-12.

The polarized beam director 60 includes two corner cube structures 66 and 68 which face in opposite directions with their optical axes coincident and parallel with one another. The corner cube structures 66 and 68 are held in position on the polarized beam director 60. The corner cube structure 66 has three mutually perpendicular walls 70, 72 and 74 which intersect one another at an actual or virtual common corner 75. The corner cube structure 68 also has three mutually perpendicular walls 76, 78 and 80 which intersect one another at an actual or virtual common corner 79. Preferably the corners 75 and 79 are coincident with each other, as shown. The corner cube structures 66 and 68 are substantially identical to the corner cube structures 38 and 50 (FIGS. 2-4 and 6-8) except for the number and placement of thin film polarizers 82 attached on ones of the three mutually perpendicular walls of each corner cube structure 66 and 68.

Figure 11:
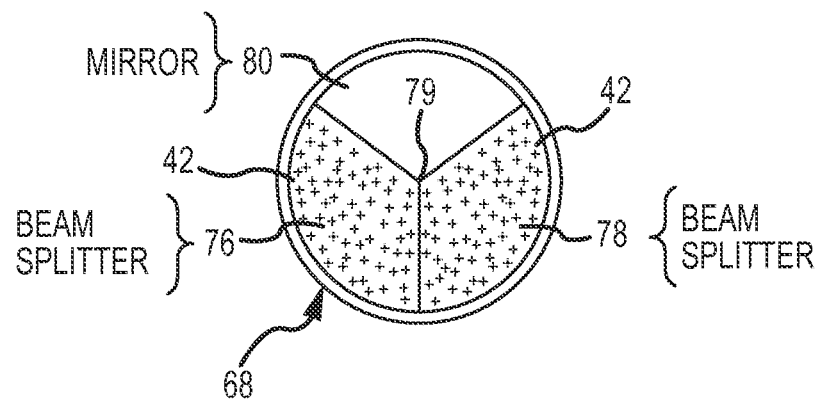
FIGS. 11 and 12 are horizontal cross-sectional views of the polarized beam director shown in FIG. 10, taken substantially in the planes of lines 11-11 and 12-12 in FIG. 10, respectively.
Figure 12:
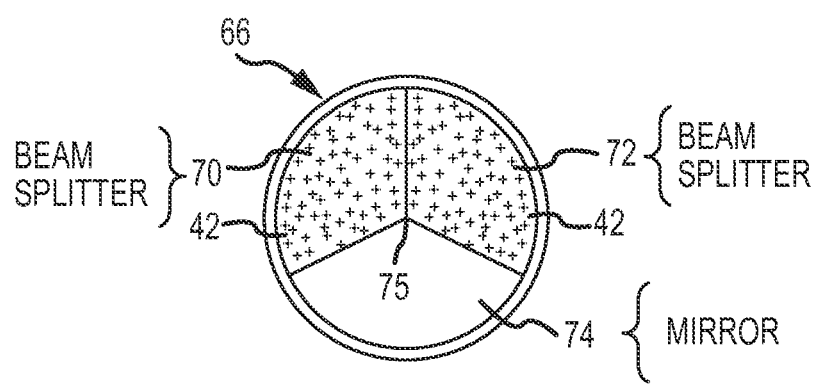
Figure 13:
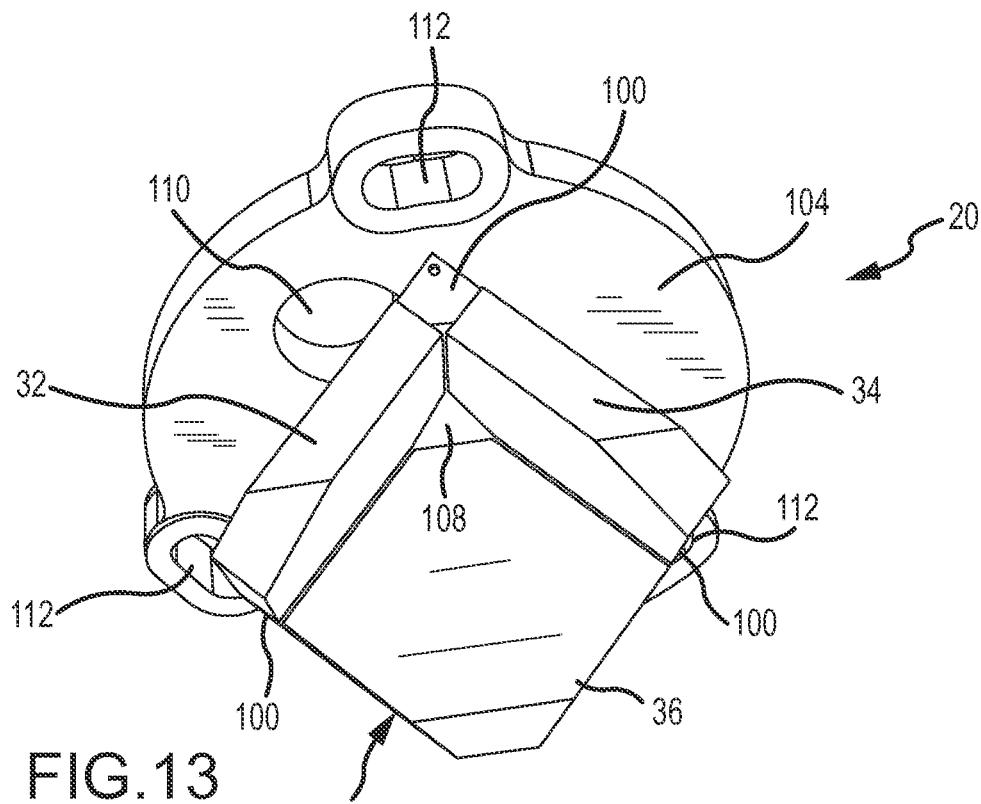
FIG. 13 is a perspective view of a physical structure of the polarized beam director shown in FIGS. 1 and 2.
Figure 14:
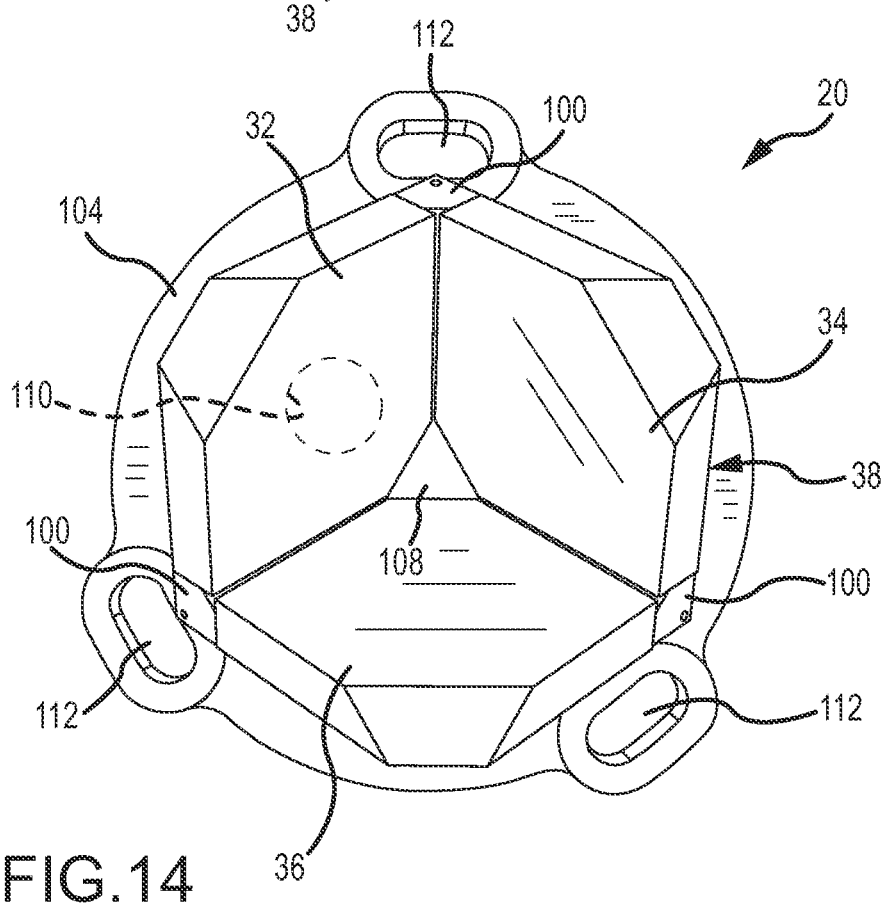
FIG. 14 is a horizontal plan view of the polarized beam director shown in FIG. 14, in the position represented in FIG. 3.
Figure 15:
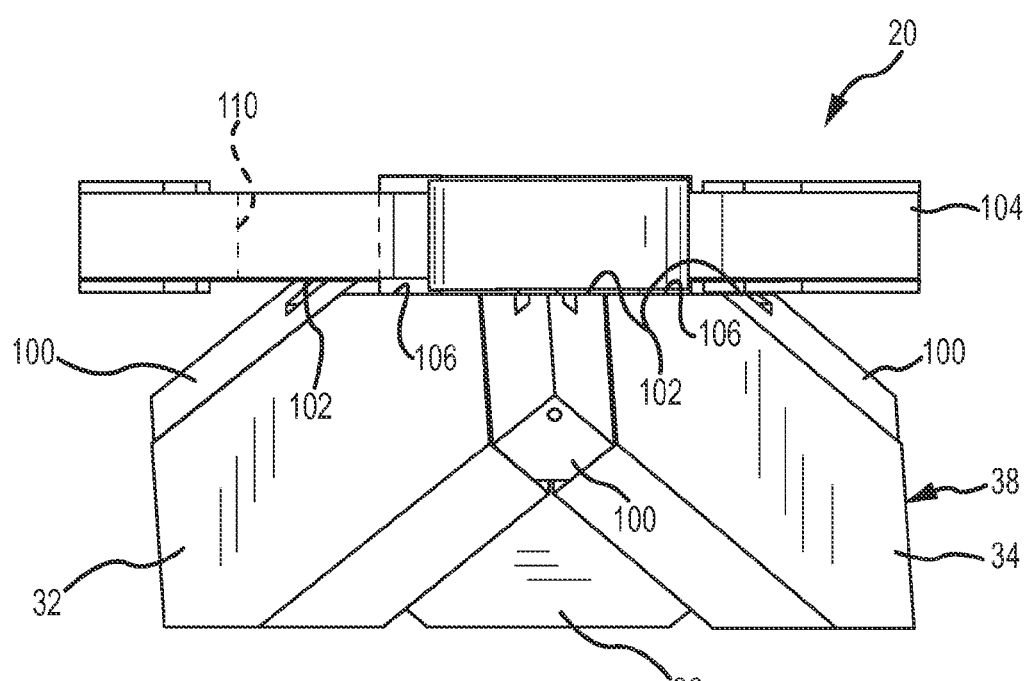
FIG. 15 is a vertical elevation view of the polarized beam director shown in FIGS. 13 and 14.
Figure 16:
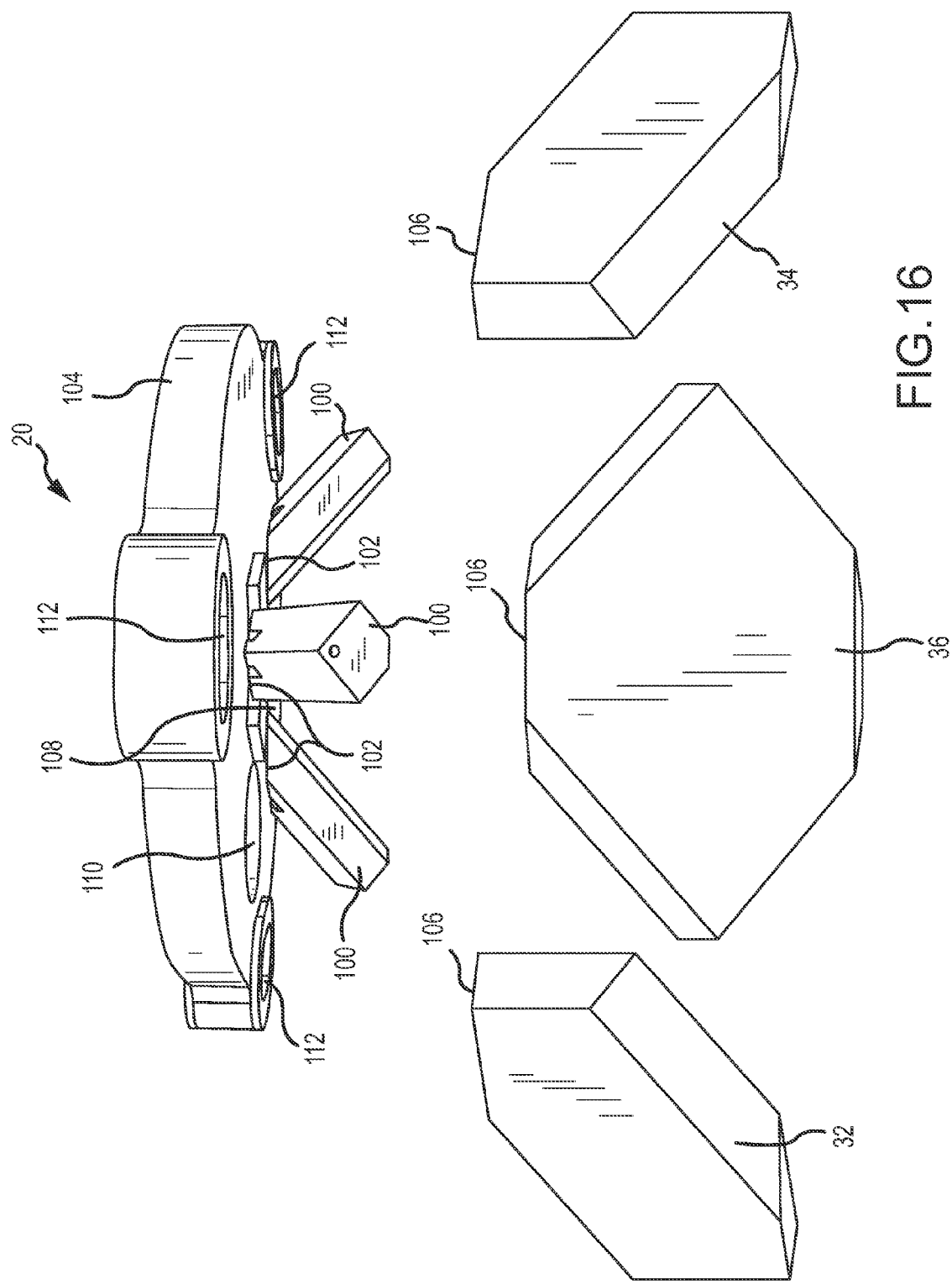
FIG. 16 is an exploded perspective view of the polarized beam director shown in FIGS. 13-15.

The walls 70 and 76, 72 and 78 and 74 and 80 are vertically offset and aligned with one another parallel to the coincident optical center points and corners 57 and 59 of the corner cube structures 66 and 68, as is understood from FIGS. 11 and 12. The walls 70, 72, 74, 76, 78 and 80 of the corner cube structures 66 and 68 are formed from a plate or layer of optically transmissive material, such as glass. The walls 70, 72 and 76, 78 of the corner cube structures 66 and 68, respectively, are formed as polarized beam splitters. Each polarized beam splitter is formed by a conventional thin film polarizer 42 attached to the optically transparent material of each wall 70, 72 and 76, 78. The walls 74 and 80 of the corner cube structures 66 and 68, respectively, are formed as mirrors or optical reflectors. Each mirror or optical reflector is formed by a layer of conventional optically reflective material attached to the walls 74 and 80.

Each thin film polarizer 42 preferably constitutes a coating of conventional polarizing optical material having the polarizing characteristics previously described in connection with the polarized beam directors 20 and 44 (FIGS. 1-4 and 5-8). The coating of polarizing material is represented by hatching in FIGS. 11 and 12. The coating of polarizing material of each thin film polarizer 42 achieves a light polarizing characteristic according to and in relation to the thickness of the coating, the angle of an incident beam impinging upon that coating, and the plane of polarization of the incident light beam. With the proper selection of the coating thickness, the angle of the incident beam and the plane of polarization of the incident beam, the coating of polarizing material has the effect of passing an incident polarized light beam which has a plane of polarization that is parallel to or aligned with the polarizing characteristics established by its thickness and the angle of incidence, while reflecting an incident polarized light beam with a perpendicular plane of polarization.

As a consequence of the vertically offset alignment of the corner cube walls 70, 76 and 72, 78 to which the thin film polarizers 42 have been attached, and the substantially identical angular orientation of the walls 70, 76 and 72, 78 relative to the aligned coincident optical axes of the corner cube structures 66 and 68, the thin film polarizers 42 pass polarized light beams through the walls 70, 72, 76 and 78 with a plane of polarization parallel to their established polarizing characteristics. A polarized light beam passing through one of the walls 70 or 72 will intersect the vertically aligned wall 76 or 78 at the same angle of incidence as on the wall 70 or 72, and will thereby pass through that wall in the same manner that it passed through the other wall, provided that the thin film polarizer coating on both walls is approximately the same thickness. The polarized beam director 60 therefore acts as an optically transparent window or optical conductor to the incident light beams 24 and/or 64, which have respective planes of polarization aligned with the polarizing characteristics of the thin film polarizers 42 on the walls 70, 76 and 72, 78, thereby directing the light beams through the polarized beam director 60 without diversion. As shown in FIGS. 10-12, the light beam 24 passes directly through the aligned beam splitter walls 70 and 76, and the light beam 64 passes directly through the aligned beam splitter walls 72 and 78.

On the other hand, incident polarized light beams 22 and 46 having planes of polarization which are not aligned with or are substantially perpendicular to the polarizing characteristics of the thin film polarizers 42 are reflected from the beam splitting walls 70, 72, 76 and 78 as though those walls were reflectors or mirrors. In this circumstance, the incident light beam 22 having a polarization plane perpendicular to the polarizing characteristics of the thin film polarizers 42 on walls 70 and 72 of the corner cube structure 66 is reflected from the walls 70, 72 and 74 of the corner cube structure 66, in the same manner as a retroreflector. Similar reflection from the walls 76, 78 and 80 of the corner cube structure 68 occurs with respect to the incident light beam 46 having polarization perpendicular to the polarizing characteristics of the thin film polarizers 42 on the walls 76 and 78. The reflected light beams 22 and 46 exit from the corner cube structures 66 and 68, respectively, in a direction parallel to the incident light beams, just as in a conventional retroreflector. As shown in FIGS. 10-12, the light beam 22 reflects from the beam splitting wall 70 onto the beam splitting wall 72 and onto the mirror wall 74, and then passes away from the corner cube structure 66 along the diverted beam path 28; and the light beam 46 reflects from the beam splitting wall 78 onto the mirror wall 80 and onto the beam splitting wall 78, and then passes away from the corner cube structure 68 along the delivery beam path 30.

When incident light beam having a non-aligned plane of polarization is reflected from the thin film polarizer 42 on a first one of the walls of either corner cube structure 66 and 68, for example walls 70 or 76, the reflected beam intersects the other two walls 72, 74 or 78, 80 of that corner cube structure 66 or 68 at a changed angle of incidence. In order to preserve the beam passing and beam reflecting characteristics of the thin film polarizer on the other one of the walls 72 or 78, the thickness of that thin film polarizer can be adjusted to continue the reflection to the wall 74 or 80 of that corner cube structure 66 or 68. As an alternative, a conventional beam rotator could be located in the space within the three mutually perpendicular walls 70, 72, 74 and 76, 78, 80 of the corner cube structures 66 and 68, to establish the appropriate orientation of the reflected beam so that it continues to reflect. The concern about maintaining the plane of polarization of the reflected beam relates to preserving sufficient energy in the reflected beam. So long as there is sufficient energy in the reflected beam, it may be unnecessary to adjust the coating thickness of the other thin film polarizer or use a beam rotator.

Thus, in response to the four polarized incident light beams 22, 24 and 46, 64, the beam splitting walls 70, 72 and 76, 78 of the polarized beam director 60 passes the vertically polarized (as shown) light beams 24 and 64 into the delivery beam path 30 and the diverted beam path 28, respectively. The corner cube structures 66 and 68, acting as retroreflectors to the mutually perpendicularly polarized light beams 22 and 46, reflect or divert those horizontally polarized (as shown) light beams 22 and 46 into the diverted beam path 28 and delivery beam path 30, respectively. The light beams 24 and 64 of the aligned polarization planes pass completely through the polarized beam director 60, as though the polarized beam director 60 was optically transparent, but the light beams 22 and 46 of the other mutually perpendicular polarization are reflected from the polarized beam director 60 in the same manner as a conventional retroreflector.

An example of a physical structure of the polarized beam director 20 (FIGS. 1-4) is shown in FIGS. 13-16. The corner cube structure 38 of the polarized beam director 20 is formed by the beam splitter walls 32 and the two mirror walls 34 and 36. The walls 32, 34 and 36 are held in the mutually perpendicular relationship to one another by corner brackets 100. Inner ends 102 of the corner brackets 100 are attached to a mounting plate 104. The inner end 102 of each corner bracket is angled to extend each of the corner brackets 100 at the appropriate angle to locate each of the walls 32, 34 and 36 at the respective mutually perpendicular relationship.

The thin film polarizer 42 (FIGS. 3 and 4) is attached to the beam splitting wall 32 before that beam splitting walls 32 is attached to the corner brackets 100. Similarly, the reflective or mirror material is attached to the mirror walls 34 and 36 before those mirror walls are attached to the corner brackets 100.

An adhesive preferably attaches the inner end 102 of each corner bracket 100 to the mounting plate. Once the adhesive between the inner end of each corner bracket and the mounting plate 104 has cured, the walls 32, 34 and 36 are attached to and between the corner brackets 100, preferably with an adhesive. An alignment jig (not shown) is used to position the corner brackets 100 on the mounting plate 104 at the appropriate position and angle to receive the walls 32, 34 and 36 therebetween, and to hold the walls 32, 34 and 36 in the mutually perpendicular relationship.

Optical alignment techniques are used to establish the mutually perpendicular position of the three walls 32, 34 and 36 when those walls are attached to the corner brackets. The optical alignment is continually assessed to confirm proper alignment while the adhesive cures between the walls 32, 34 and 36 and the corner brackets 100. Proper optical alignment of the three walls 32, 34 and 36 in the mutually perpendicular relationship will result in an incident light beam having polarizing characteristics perpendicular to the beam splitting characteristics of the thin film polarizer 42 on the wall 32, reflecting from the walls 32, 34 and 36 in a beam path parallel to the beam path of the incident beam. Continual monitoring of this parallel relationship between the beam paths 26 and 28 ensures that the walls 32, 34 and 36 are kept in the appropriate alignment to ensure the mutual perpendicularity.

Preferably, the corner brackets 100 are formed as elongated rods having a square cross-section and made of the same type of optically transmissive material from which the walls 32, 34 and 36 are formed, such as glass. Forming the corner brackets 100 and the walls 32, 34 and 36 from the same type of optically transmissive material avoids or minimizes problems that arise from thermal expansion. Thermal expansion could cause aberrant forces that could distort the walls 32, 34 and 36 from their mutually perpendicular relationship.

The corner 40 (FIGS. 2-4) of the walls 32, 34 and 36 is virtual, because the walls 32, 34 and 36 do not extend to a physical corner point. Instead each of the walls is truncated at an angled surface 106 which extends parallel to the surface of the mounting plate when the walls 32, 34 and 36 are attached to the corner brackets 100. A slight space exists between the angled surfaces 106 of the walls 32, 34 and 36 and the adjoining surface of the mounting plate 104, to avoid transferring aberrant forces from the mounting plate to each of the walls.

The virtual corner point of the walls 32, 34 and 36 exists within a center opening 108 formed through the mounting plate 104 at the center of the equilateral triangle created where the angled surfaces 106 of the walls 32, 34 and 36 adjoin the mounting plate. Another opening, referred to as a pass-through opening 110, is formed through the mounting plate at a position generally aligned with the beam splitter wall 32. The opening 110 allows the light beam 24 (FIGS. 1 and 2) which is aligned with the polarizing characteristics of the beam splitter wall 32 to pass through the mounting plate 104 and the polarized beam director 20 into the delivery beam path 30 (FIGS. 1 and 2). As appreciated from FIGS. 1, 2, 13 and 14, the incident polarized light beam 24 passes through the beam splitter wall 32 and through the opening 110 into the delivery beam path. Mounting openings 112 in the mounting plate 104 are used to attach the polarized beam director 20 in a position of use.

Figure 17:
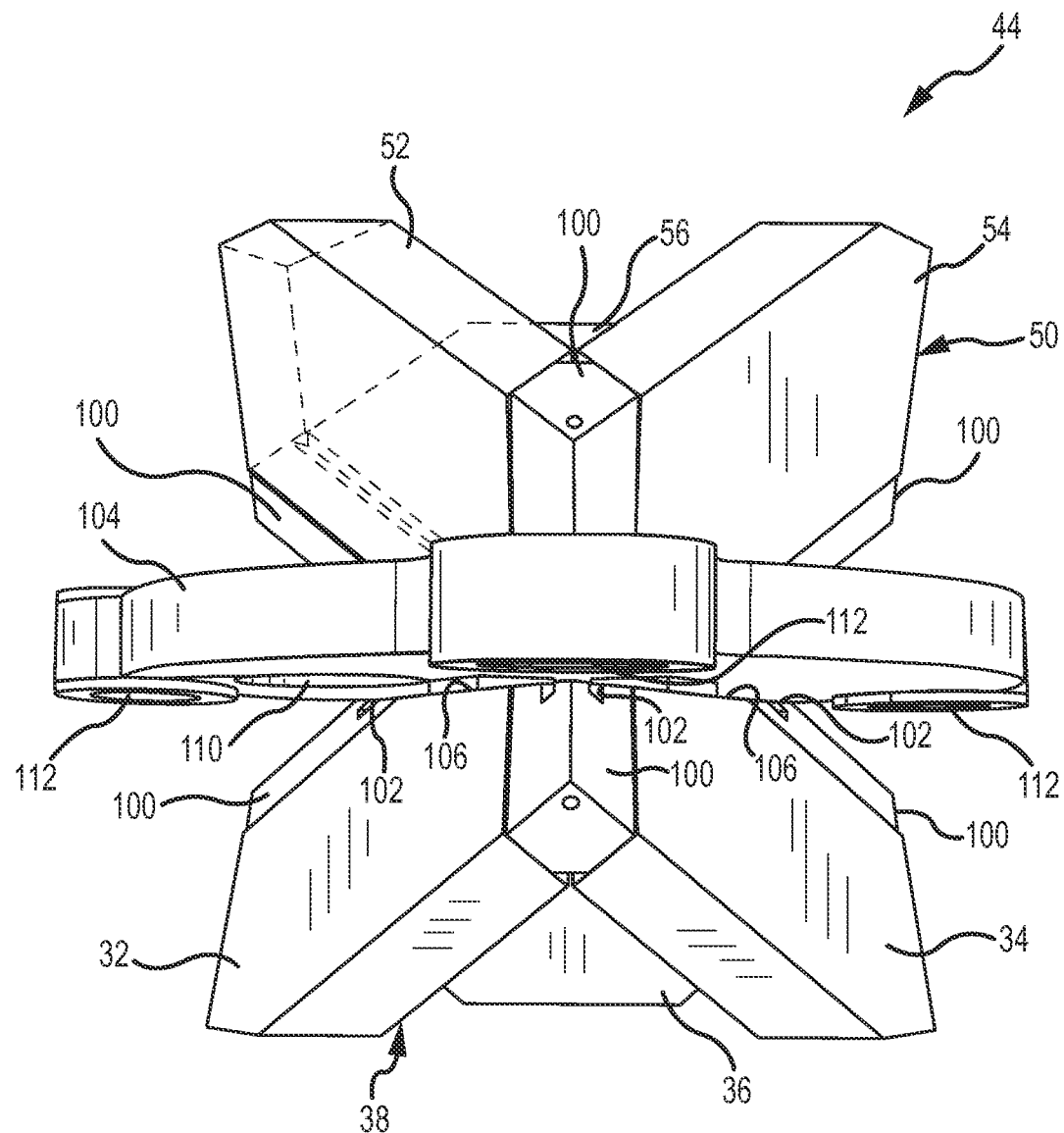
FIG. 17 is a perspective view of a physical structure of the polarized beam director shown in FIGS. 5 and 6.

An example of a physical structure of the polarized beam director 44 (FIGS. 5-8) is shown in FIG. 17. The polarized beam director 44 includes the two corner cube structures 38 and 50, each of which is located on the opposite side of the mounting plate 104. The corner cube structure 38 is formed by the beam splitter wall 32 and the two mirror walls 34 and 36, which are held in the mutually perpendicular relationship to one another by corner brackets 100. The corner cube structure 50 is formed by the beam splitter wall 52 and the two mirror walls 54 and 56. The walls 52, 54 and 56 are held in the mutually perpendicular relationship to one another by the corner brackets 100 which are attached to and extend from the mounting plate 104 on the opposite side of the corner cube structure 38. The corner brackets 100 on both sides of the mounting plate 104 have the same configuration and are attached to the mounting plate 104 in the same manner previously described in conjunction with the polarized beam director 20.

The thin film polarizers 42 (FIGS. 7 and 8) are attached to the beam splitting walls 32 and 52 before that beam splitting walls 32 and 52 are attached to the corner brackets 100. Similarly, the reflective or mirror material is attached to the mirror walls 34, 54 and 36, 56 before those mirror walls are attached to the corner brackets 100.

The inner ends 102 of the six corner brackets 100 are attached to the mounting plate 104, preferably by use of adhesive. Similarly, once the adhesive holding each corner bracket to the mounting plate 104 has cured, the walls 32, 34, 36 and 52, 54, 56 are attached to and between the corner brackets 100, preferably with an adhesive. An alignment jig (not shown) is used to position the six corner brackets 100 on the mounting plate 104 and the walls 32, 34, 36 and 52, 54, 56 between the corner brackets. The walls 32, 34, 36 and 52, 54, 56 are established and maintained in the mutually perpendicular relationship when attached to the corner brackets by optical alignment in the manner previously described.

The corner 40 (FIGS. 2-4) of the walls 32, 34 and 36, and the corner 58 of the walls 52, 54 and 56, is each virtual, because the walls 32, 34, 36 and 52, 54, 56 do not extend to a physical corner point. Instead each of the walls is truncated at the angled surface 106, as previously described (FIGS. 13-16). The virtual corners 40 and 56 are coincident with one another and exist within the center opening 108 formed through the mounting plate 104 at the equilateral triangle created where the angled surfaces 106 of the walls 32, 34, 36 and 52, 54, 56 adjoin the mounting plate.

The pass-through opening 110, is formed through the mounting plate 104 at a position generally aligned with the beam splitter walls 32 and 52. The opening 110 allows the light beam which is aligned with the polarizing characteristics of the beam splitter walls 32 and 52 to pass through the polarized beam director 44 into the delivery beam path 30 (FIGS. 5 and 6). As appreciated from FIGS. 5, 6, 13 and 14, the incident polarized light beam 24 passes through the beam splitter walls 32 and 52 and through the opening 110 into the delivery beam path 30.

Figure 18:
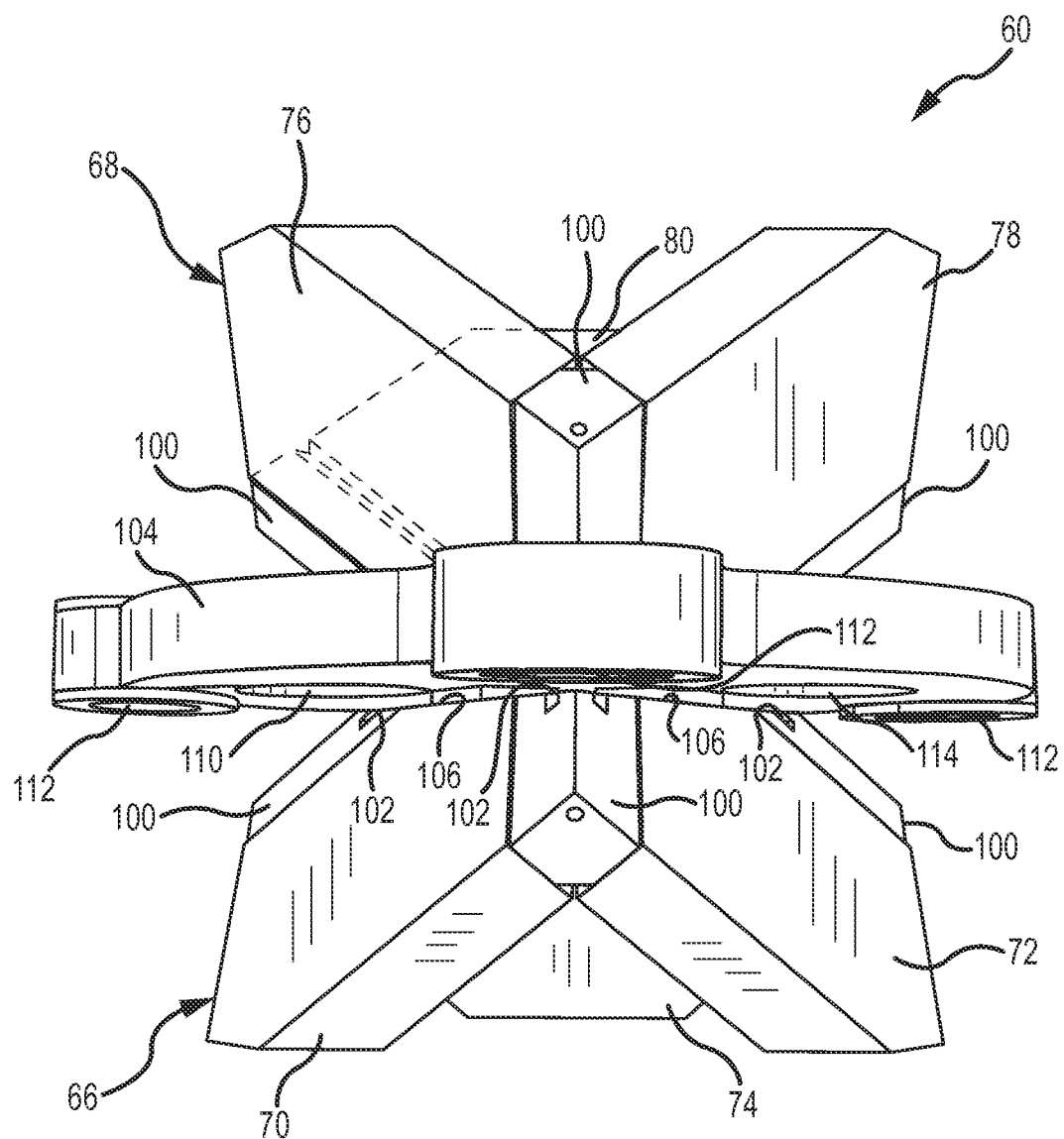
FIG. 18 is a perspective view of a physical structure of the polarized beam director shown in FIGS. 9 and 10.

An example of physical structure for the polarized beam director 60 (FIGS. 9-12) is shown in FIG. 18. The polarized beam director has essentially the same physical structure as the previously described polarized beam director 44 (FIG. 17), except for the additional beam splitter walls 72 and 78 and an additional pass-through opening 114 located in the mounting plate 104 in alignment with the additional beam splitter walls.

The polarized beam director 60 is formed by two corner cube structures 66 and 68 (FIGS. 9-12) located on opposite sides of the mounting plate 104. The corner cube structure 66 is formed by the beam splitter walls 70 and 72 and the mirror wall 74, and the corner cube structure 68 is formed by the beam splitter walls 76 and 78 and the mirror wall 80. The walls of each corner cube structure are held and aligned in the mutually perpendicular relationship to one another by corner brackets 100, in the same manner previously described in conjunction with the polarized beam directors 20 and 44.

The pass-through opening 110 is formed through the mounting plate 104 at a position generally aligned with the beam splitter walls 72 and 76, and the other pass-through opening 114 is formed through the mounting plate 104 as a position generally aligned with the beam splitter walls 74 and 78. The openings 110 and 114 allow the light beam which are aligned with the polarizing characteristics of the beam splitter walls 72, 76 and 74, 78 to pass through the openings 110 and 114 into the delivery beam path 30 and the diverted beam path 28 (FIGS. 9 and 10). As appreciated from FIGS. 9, 10, 13 and 14, the incident polarized light beam 24 passes through the beam splitter walls 72 and 76 and through the opening 110 into the delivery beam path 30, and the incident polarized light beam 64 passes through the beam splitter walls 74 and 78 and through the opening 114 into the diverted beam path 28.

In all of the previous described embodiments of the polarized beam directors 20, 44 and 60, corner cube structures are regarded as open, because an incident light beam passes through the ambient environment as it reflects off of the reflective wall surfaces and exits the corner cube structure as a reflected light beam. Corner cube structures can also be of the closed variety. A closed corner cube structure is constructed of a body of solid glass or other high-grade transparent optical material. The three mutually perpendicular wall surfaces are machined or otherwise formed on the body. The reflective wall surfaces are coated with a reflective material to reflect light impinging on the wall surfaces and a thin film polarizer is applied to the beam splitting surfaces. An incident light beams pass through the body of the closed corner cube structure. A light beam incident on the wall surfaces within aligned polarization passes out of the body of the closed corner cube structure. An incident beam of a nonaligned or mutually perpendicular polarization reflects from the wall surfaces in the body of this corner cube structure, as does the light reflecting from the mirror wall surfaces.

While a closed corner cube structure can be used in place of each open corner cube structure described herein, the closed corner cube structure has the effect of changing the speed of the light beam passing through the optical body of the corner cube structure. Using open corner cube structures causes the speed of light to remain constant throughout the reflected beam paths.

As is apparent from the preceding discussion, the different embodiments of the polarized beam directors are formed as a single optical element, a corner cube structure, thereby avoiding the problems of assembling, aligning and maintaining the alignment of multiple discrete optical elements. The capability of simultaneously separating and diverting one polarized light beam from another polarized light beam, and combining one incident polarized light beam with another polarized light beam is readily achieved by the optical arrangement of beam splitter and reflective walls of the corner cube structures. The separation and combination is achieved without adversely a common path polarized light beam from which the separated light beam was previously combined and to which the other incident light beam is combined. Because the corner cube structures are compact in size, the polarized beam directors is convenient for use in devices and applications where space is limited. The optical characteristics of the corner cube structure inherently compensate for the effects of temperature change and external vibrations and perturbations, without adversely influencing the information carried by the multiple polarized light beams. Many other advantages and improvements will become apparent upon fully appreciating the many aspects of the present invention.

Presently preferred embodiments of the present invention and many of its improvements have been described with a degree of particularity. This description is of preferred examples of implementing the invention, and this description is not necessarily intended to limit the scope of the invention. The scope of the invention is defined by the scope of the following claims.

What is claimed:

1. A method of using a polarized beam director for separately directing first and second polarized incident light beams having respectively different planes of polarization from an incident beam path, wherein the polarized beam director comprises:
a corner cube structure comprising first, second and third walls occupying a mutually perpendicular relationship with respect to one another and intersecting at one of an actual or virtual corner, the first wall comprises a polarized beam splitter which has polarization characteristics which pass the first incident light beam and which reflect the second incident light beam, and the first, second and third walls reflect the second incident light beam; and wherein the method comprises:
impinging the first and second incident light beams on the first wall of the corner cube structure from the incident beam path;
passing the first light beam through the beam splitter of the first wall and into a delivery beam path which is separate from the incident beam path; and
reflecting the second light beam from the first, second and third walls and into a diverted beam path which is separate from the incident beam path and the delivery beam path.

2. A method as defined in claim 1, wherein:
the second wall comprises a polarized beam splitter which has polarization characteristics which reflect the second incident light beam.

3. A method as defined in claim 1, wherein:
the second and third walls comprise mirrors.

4. A method as defined in claim 1 wherein:
the first, second and third walls define an open corner cube structure, and the second light beam reflects within the open corner cube structure.

5. A method as defined in claim 1, wherein:
the first and second light beams exit the polarized beam director in the delivery beam path and the diverted beam path, respectively.

6. A method as defined in claim 5, wherein:
the incident beam path, the delivery beam path and the diverted beam path extend parallel to one another.

7. A method as defined in claim 6, wherein:
the first and second light beams are coincident with one another in the incident beam path.

8. A method as defined in claim 1, wherein the polarized beam director is used in a gravity measurement instrument to measure a characteristic of gravity.

9. A method as defined in claim 8, wherein the characteristic of gravity is a gradient of gravity.

10. A polarized beam director for separately directing first and second polarized incident light beams having respectively different planes of polarization, comprising:
a first corner cube structure comprising first, second and third walls occupying a mutually perpendicular relationship with respect to one another and intersecting at one of an actual or virtual corner, the first and second incident light beams impinging upon at least one of the first, second and third walls; and wherein:
the first wall comprises a polarized beam splitter;
the beam splitter of the first wall has polarization characteristics which pass the first incident light beam and reflect the second incident light beam; and
the first, second and third walls reflect the second incident light beam; and further comprising:
a second corner cube structure comprising fourth, fifth and sixth walls occupying a mutually perpendicular relationship with respect to one another and intersecting at one of an actual or virtual corner; and wherein:
the fourth wall comprises a polarized beam splitter;
the second corner cube structure is positioned relative to the first corner cube structure with the beam splitter of the fourth wall located to intersect the first incident light beam passed by the beam splitter of the first wall; and the beam splitter of the fourth wall has polarization characteristics which pass the first incident light beam passed by the beam splitter of the first wall.

11. A polarized beam director as defined in claim 10, which also directs a third incident polarized light beam having a plane of polarization different from the plane of polarization of the first incident light beam, wherein:

the third incident light beam impinges on the fourth wall;

the beam splitter of the fourth wall has polarization characteristics which reflect the third incident light beam; and the fifth and sixth walls reflect the third incident light beam.

12. A polarized beam director as defined in claim 11, wherein:

the fifth and sixth walls comprise mirrors.

13. A polarized beam director as defined in claim 11, wherein:

the first and second incident light beams occupy an incident beam path;

the first light beam exits the polarized beam director in a delivery beam path which is separate from the incident beam path;

the second light beam exits the polarized beam director in a diverted beam path which is separate from both the incident beam path and the delivery beam path; and the third light beam exits of the polarized beam director in the delivery beam path.

14. A polarized beam director as defined in claim 13, wherein:

the incident beam path, the delivery beam path and the diverted beam path extend parallel to one another.

15. A polarized beam director as defined in claim 13, wherein:

the first and third light beams are coincident with one another in the delivery beam path.

16. A polarized beam director as defined in claim 11, wherein:

the fifth wall comprises a polarized beam splitter which has polarization characteristics which reflect the third incident light beam.

17. A polarized beam director as defined in claim 16, which also directs a fourth incident polarized light beam having a plane of polarization different from the plane of polarization of the third incident light beam, wherein:

the beam splitter of the fifth wall has polarization characteristics which pass the fourth incident light beam;

the second wall comprises a polarized beam splitter which has polarization characteristics which reflect the second incident light beam and which pass the fourth incident light beam;

the second corner cube structure is positioned relative to the first corner cube structure with the beam splitter of the fifth wall located to pass the fourth incident light beam to the beam splitter of the second wall; and the beam splitter of the second wall passes the fourth incident light beam passed by the beam splitter of the fifth wall.

18. A polarized beam director as defined in claim 17, wherein:

the first and second incident light beams occupy a first incident beam path;

the third and fourth incident light beams occupy a second incident beam path which is separate from the first incident beam path;

the first and third light beams exit the polarized beam director in a delivery beam path which is separate from the first and second incident beam paths; and the second and fourth light beams exit the polarized beam director in a diverted beam path which is separate from the first and second incident beam paths and the delivery beam path.

19. A polarized beam director as defined in claim 18, wherein:

the first incident beam path, the second incident beam path, the delivery beam path and the diverted beam path extend parallel to one another.

20. A polarized beam director as defined in claim 18, wherein:

the first and second light beams are coincident with one another in the first incident beam path; and the third and fourth light beams are coincident with one another in the second incident beam path.

21. A polarized beam director as defined in claim 20 wherein:

the first and third light beams are coincident with one another in the delivery beam path; and the second and fourth light beams are coincident with one another in the diverted beam path.

22. A polarized beam director as defined in claim 21, wherein:

the first and second incident beam paths, the delivery beam path and the diverted beam path extend parallel to one another.

23. A polarized beam director as defined in claim 18, wherein:

the first and third light beams are coincident with one another in the delivery beam path; and the second and fourth light beams are coincident with one another in the diverted beam path.

24. A polarized beam director as defined in claim 17, wherein:

the third and sixth walls comprise mirrors.

25. A polarized beam director as defined in claim 17, wherein:

the virtual corners of the first and second corner cube structures are positioned coincidently.

26. A method of using the polarized beam director defined in claim 17 to separately direct the first, second, third and fourth incident light beams, comprising:

impinging the first and second incident light beams on the first wall of the first corner cube structure from a first incident beam path;

passing the first light beam through the beam splitters of the first and fourth walls and into a delivery beam path which is separate from the first incident beam path;

reflecting the second light beam from the first, second and third walls and into a diverted beam path which is separate from the first incident beam path and the delivery beam path;

impinging the third and fourth incident light beams on one of the walls of the second corner cube structure from a second incident beam path which is separate from the first incident beam path, the delivery beam path and the diverted beam path;

reflecting the third incident light beam from the fourth, fifth and sixth walls and into the delivery beam path; and passing the fourth light beam through the beam splitters of the second and fifth walls and into the diverted beam path.

27. A method of using the polarized beam director defined in claim 17 in a gravity measurement instrument to measure a characteristic of gravity.

28. A method as defined in claim 27, wherein the characteristic of gravity is a gradient of gravity.

29. A method of using the polarized beam director defined in claim 11 to separately direct the first, second and third incident light beams, comprising:
- impinging the first and second incident light beams on the first wall of the first corner cube structure from a first incident beam path;
- passing the first light beam through the beam splitter of the first wall and through the beam splitter of the fourth wall and into a delivery beam path which is separate from the first incident beam path;
- reflecting the second light beam from the first, second and third walls and into a diverted beam path which is separate from the first incident beam path and the delivery beam path;
- impinging the third incident light beam on one of the walls of the second corner cube structure from a second incident beam path which is separate from the first incident beam path and the delivery beam path; and
- reflecting the third incident light beam from the fourth, fifth and sixth walls and into the delivery beam path.

30. A method of using the polarized beam director defined in claim 10 in a gravity measurement instrument to measure a characteristic of gravity.

31. A method as defined in claim 30, wherein the characteristic of gravity is a gradient of gravity.

\* \* \* \* \*